United States Patent
Rofougaran

(10) Patent No.: US 8,090,879 B2
(45) Date of Patent: *Jan. 3, 2012

(54) MULTIBAND COMMUNICATION DEVICE WITH GRAPHICAL CONNECTION INTERFACE AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,894

(22) Filed: Sep. 24, 2010

(65) Prior Publication Data

US 2011/0014943 A1    Jan. 20, 2011

Related U.S. Application Data

(63) Continuation of application No. 12/240,663, filed on Sep. 29, 2008, now Pat. No. 7,831,738.

(51) Int. Cl.
*G06F 15/16* (2006.01)
(52) U.S. Cl. ......... 709/250; 709/230; 709/238; 709/223
(58) Field of Classification Search .................. 709/250, 709/230, 238, 223
See application file for complete search history.

(56) References Cited

U.S. PATENT DOCUMENTS

| | | | |
|---|---|---|---|
| 6,922,559 B2 * | 7/2005 | Mohammed | 455/421 |
| 2008/0153549 A1 * | 6/2008 | Korevaar et al. | 455/561 |
| 2008/0207200 A1 * | 8/2008 | Fein et al. | 455/426.1 |
| 2008/0311943 A1 * | 12/2008 | Earl | 455/509 |
| 2008/0311944 A1 * | 12/2008 | Hansen et al. | 455/517 |
| 2009/0195370 A1 * | 8/2009 | Huffman et al. | 340/426.13 |
| 2010/0011128 A1 * | 1/2010 | Paycher et al. | 710/1 |

* cited by examiner

*Primary Examiner* — Philip B Tran
(74) *Attorney, Agent, or Firm* — Garlick Harrison & Markison; Bruce E. Garlick

(57) ABSTRACT

A communication device includes an RF transceiver for communicating first data with a first remote communication device via a first protocol and a first frequency band in a first mode of operation. A millimeter wave transceiver communicates second data with a second remote communication devices via a second protocol and a 60 GHz frequency band in a second mode of operation. A communication control module coordinates the communication of the first data and the second data with the at least one of the plurality of remote communication devices. A graphical interface device selects the first remote communication device and the second remote communication device and selects at least one of the first mode of operation and the second mode of operation, based on actions of a user.

18 Claims, 14 Drawing Sheets

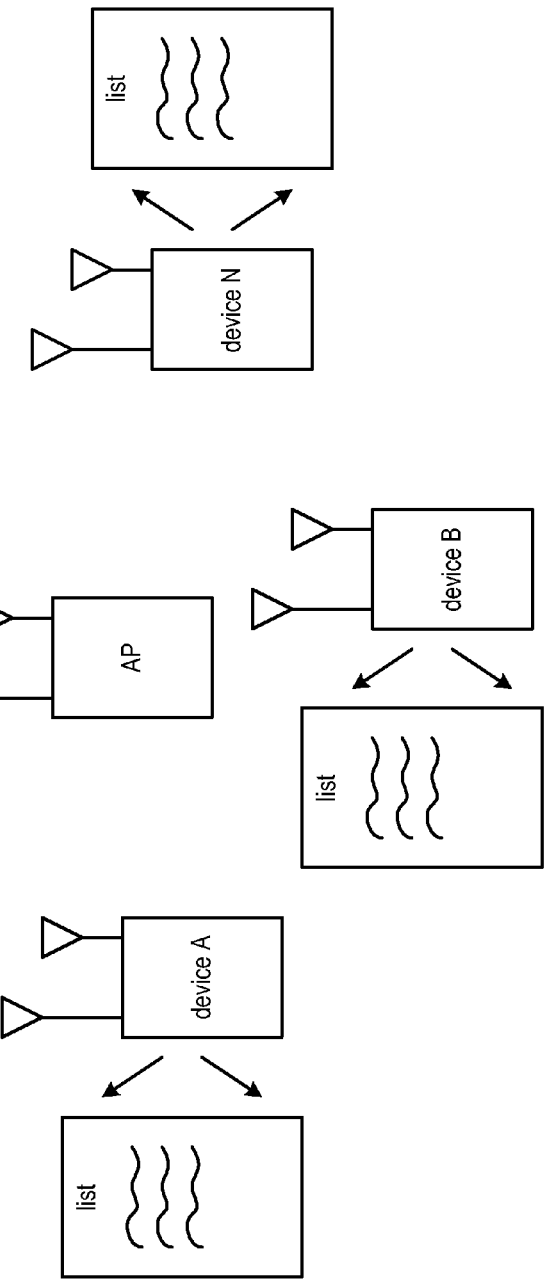

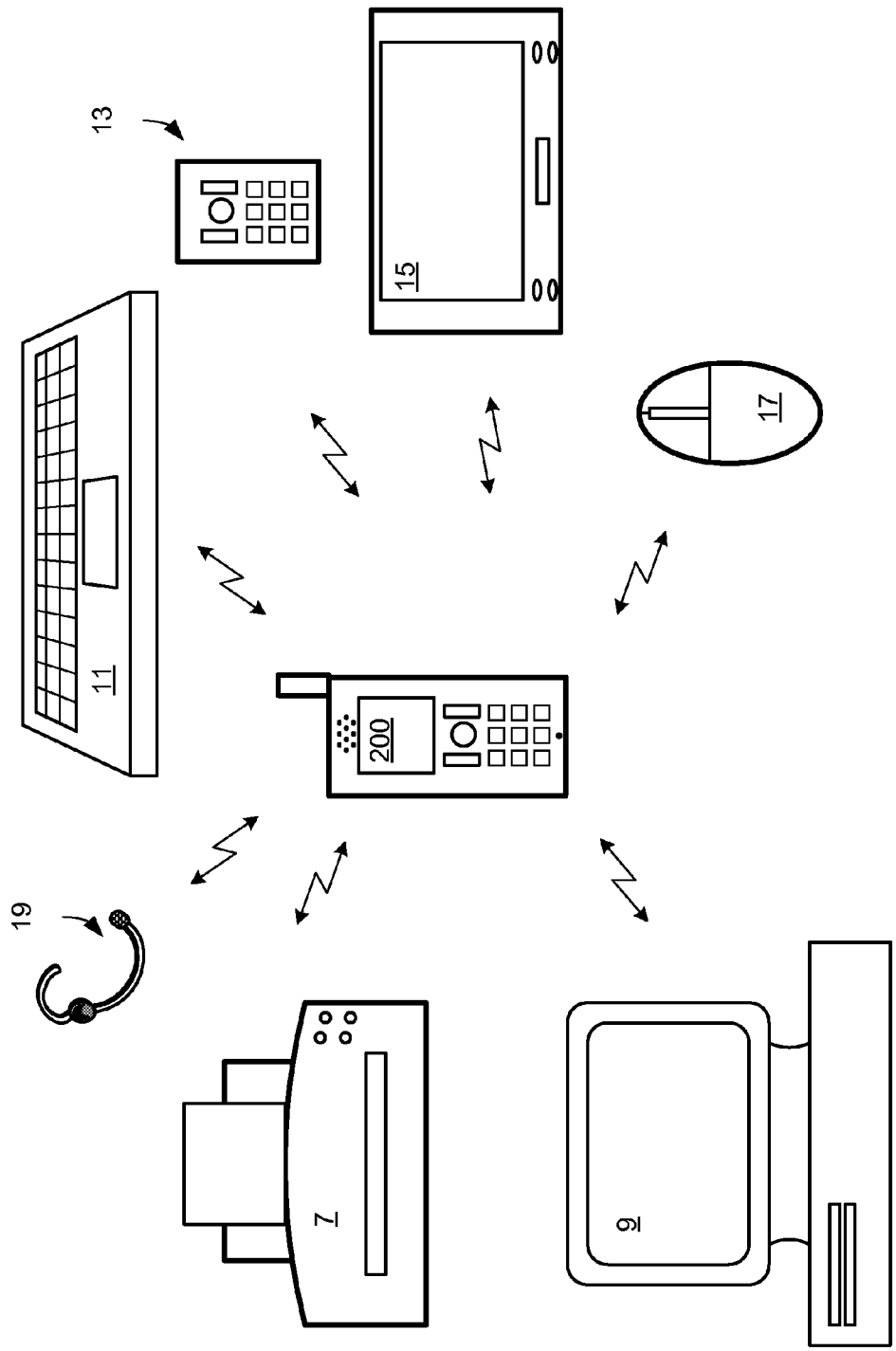

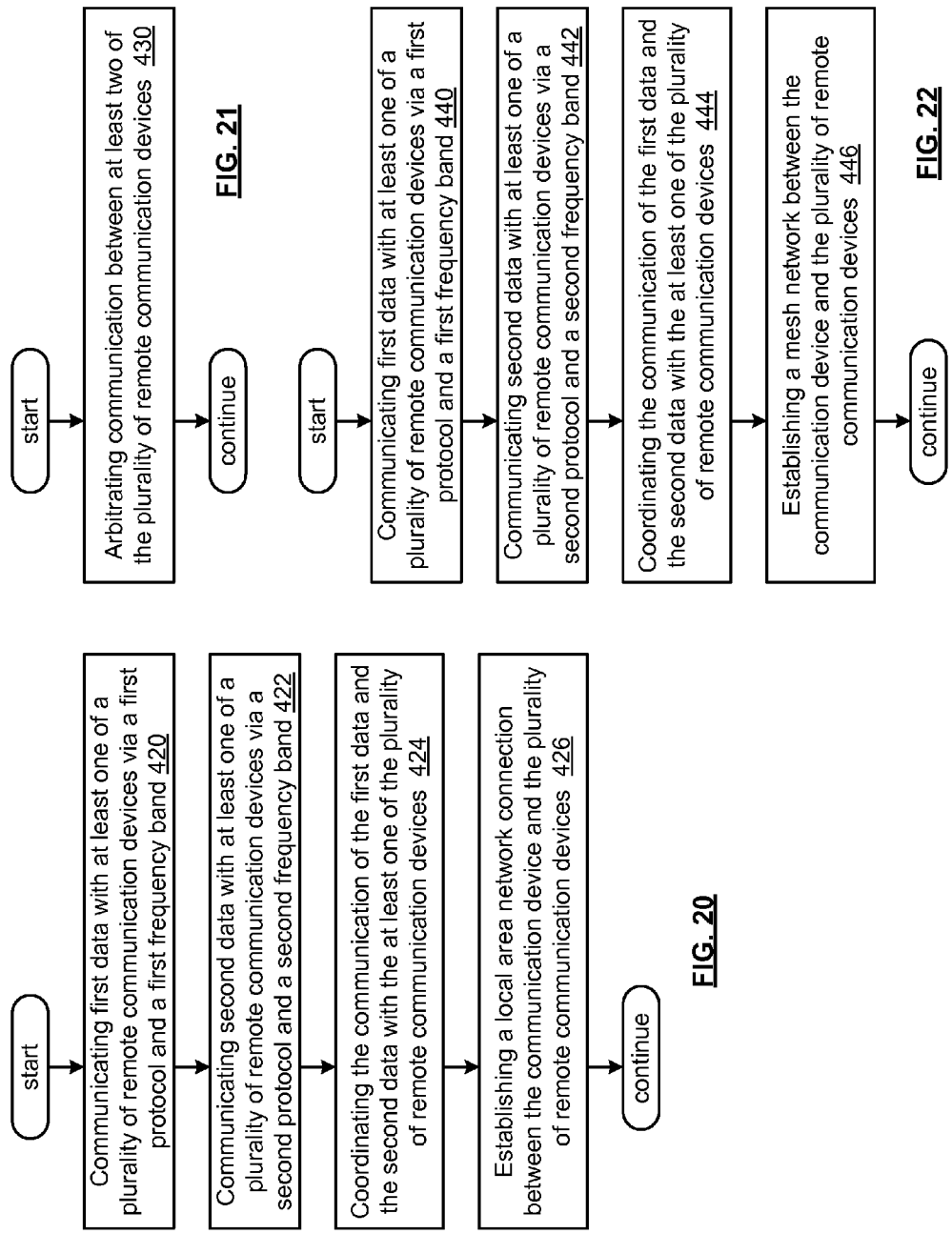

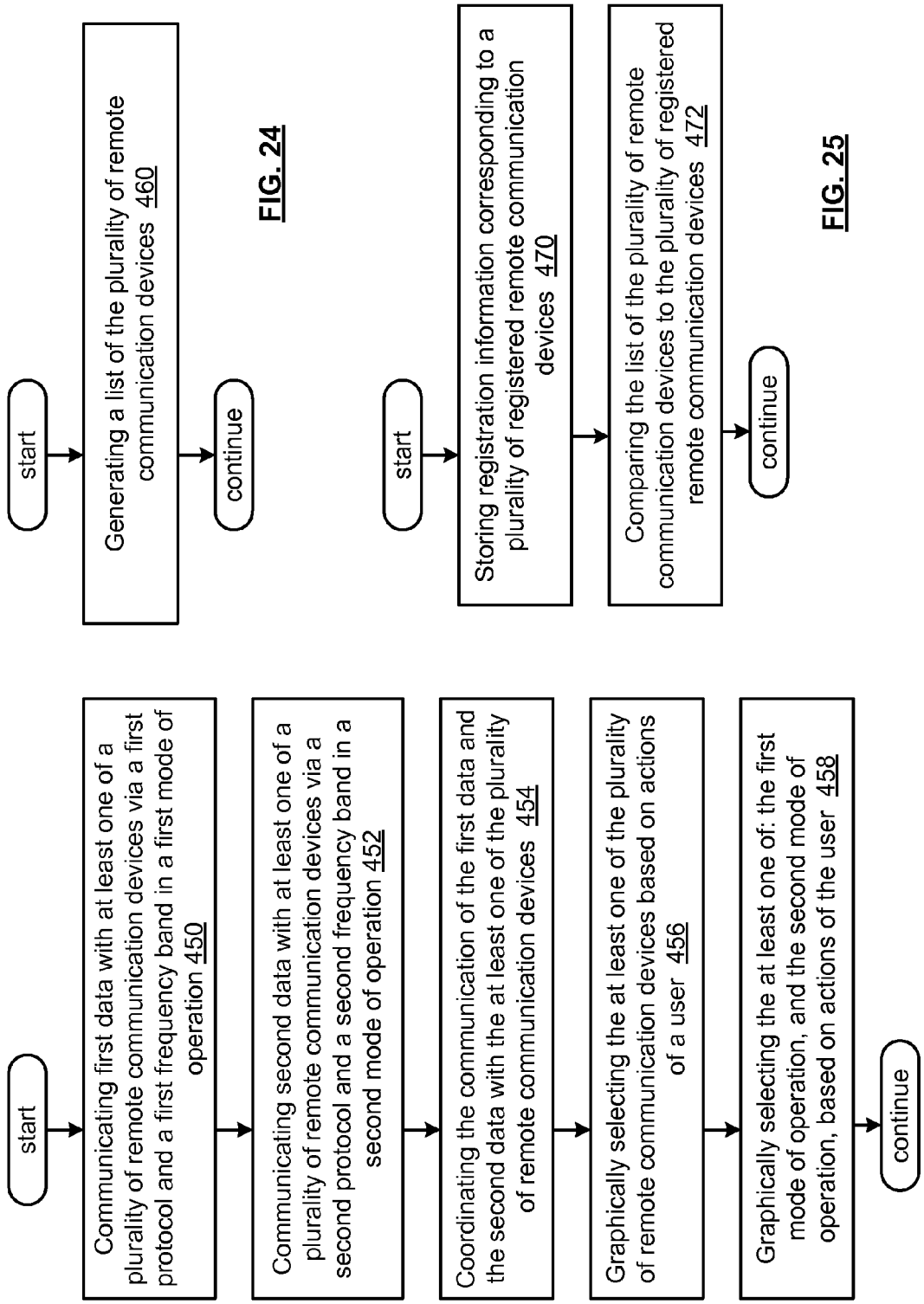

MULTIBAND COMMUNICATION DEVICE WITH GRAPHICAL CONNECTION INTERFACE AND METHODS FOR USE THEREWITH

CROSS REFERENCE TO RELATED APPLICATIONS

The present application claims priority under 35 U.S.C. 120 as a continuation of the copending application entitled, MULTIBAND COMMUNICATION DEVICE WITH GRAPHICAL CONNECTION INTERFACE AND METHODS FOR USE THEREWITH, having Ser. No. 12/240,663, filed on Sep. 29, 2008, the contents of which are incorporated herein by reference thereto.

The present application is also related to the following:

U.S. Utility application Ser. No. 12/240,617, entitled, MULTIBAND COMMUNICATION DEVICE WITH COMMUNICATION CONTROL AND METHODS FOR USE THEREWITH, filed on Sep. 29, 2008;

U.S. Utility application Ser. No. 12/240,637, entitled, MULTIBAND COMMUNICATION DEVICE FOR USE WITH A LOCAL AREA NETWORK AND METHODS FOR USE THEREWITH, filed on Sep. 29, 2008;

U.S. Utility application Ser. No. 12/240,649, entitled, MULTIBAND COMMUNICATION DEVICE FOR USE WITH A MESH NETWORK AND METHODS FOR USE THEREWITH, filed on Sep. 29, 2008;

U.S. Utility application Ser. No. 12/240,672, entitled, MULTIBAND COMMUNICATION DEVICE FOR ESTABLISHING A VIRTUAL PRIVATE NETWORK AND METHODS FOR USE THEREWITH, filed on Sep. 29, 2008;

U.S. Utility application Ser. No. 12/240,681, entitled, MULTIBAND COMMUNICATION DEVICE FOR COMMUNICATION CONTROL OF REMOTE DEVICES AND METHODS FOR USE THEREWITH, filed on Sep. 29, 2008; the contents of which are also incorporated herein by reference thereto.

BACKGROUND OF THE INVENTION

1. Technical Field of the Invention

This invention relates generally to mobile communication devices and more particularly to a wireless communications used therewith.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, millimeter wave transceiver, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

The advantages of the present invention will be apparent to one skilled in the art when presented with the disclosure herein.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 12 is a graphical representation of a device list in accordance with the present invention;

FIG. 13 is a schematic block diagram of an embodiment of another communication system in accordance with the present invention;

FIG. 17 is a schematic block diagram of an embodiment of another communication system in accordance with the present invention;

FIG. 20 is a flow chart of an embodiment of a method in accordance with the present invention;

FIG. 21 is a flow chart of an embodiment of a method in accordance with the present invention;

FIG. 22 is a flow chart of an embodiment of a method in accordance with the present invention;

FIG. 23 is a flow chart of an embodiment of a method in accordance with the present invention;

FIG. 24 is a flow chart of an embodiment of a method in accordance with the present invention;

FIG. 25 is a flow chart of an embodiment of a method in accordance with the present invention;

DETAILED DESCRIPTION OF THE INVENTION

Figure 1:
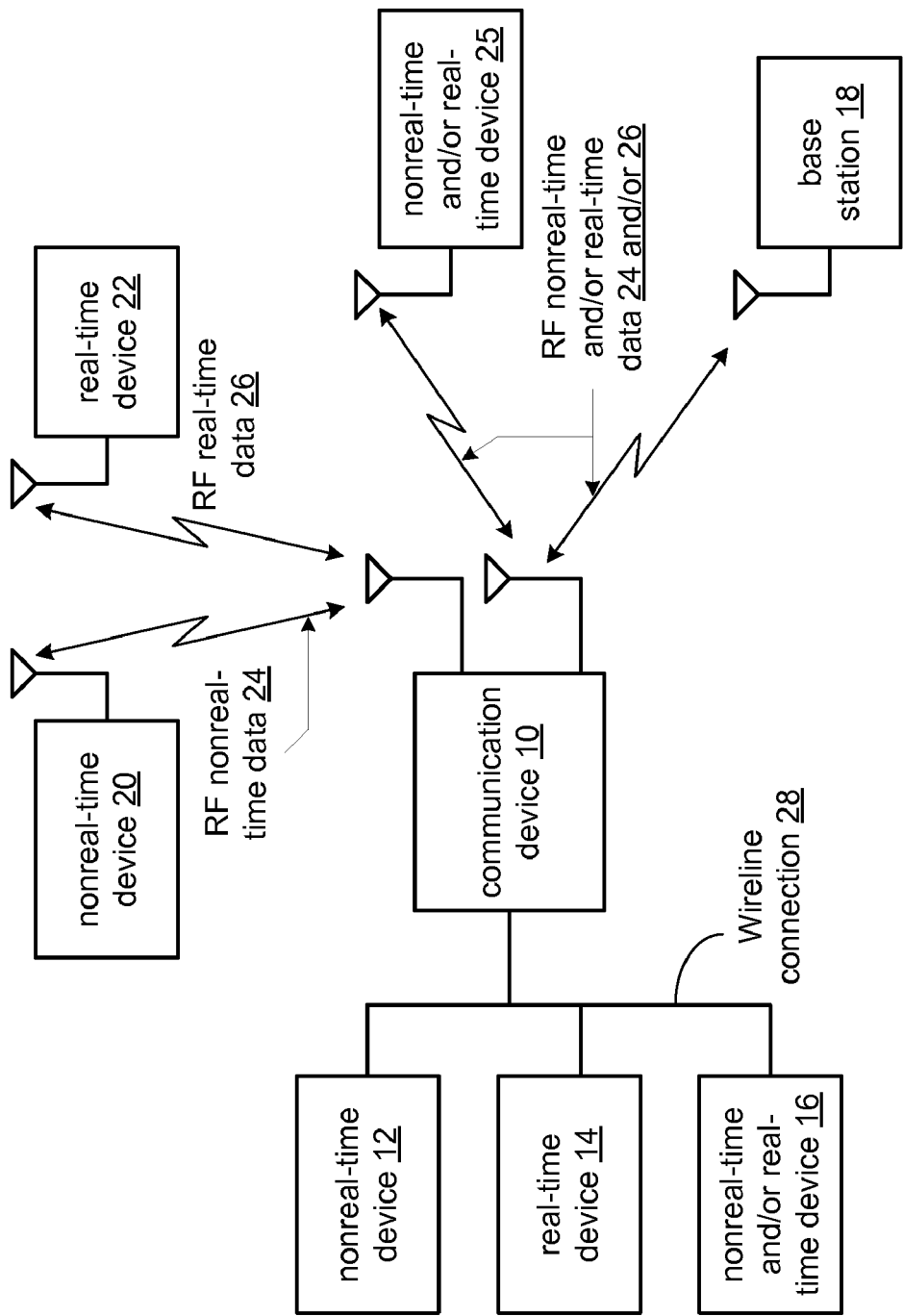
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25 via two different communication paths. In addition, communication device 10 can also communicate via wireline communications with non-real-time device 12, real-time device 14, non-real-time and/or real-time device 16.

The wireless connections can communicate in accordance with a wireless network protocol such as a millimeter wave communication protocol, IEEE 802.11, Bluetooth, Ultra-Wideband (UWB), ZigBee, infrared data association (IrDA), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10 for each wireless connection.

Communication device 10 can be a mobile phone such as a cellular telephone, a personal digital assistant, communications device, personal computer, laptop computer, or other device that performs one or more functions that include communication of voice and/or data via two or more wireless communication paths. In an embodiment of the present invention, the real-time and non-real-time devices 12, 14, 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, a mouse or other pointing device, a touch pad, keyboard, keypad, microphone, earphones, headsets or other devices that either produce, process or use audio, video signals or other data or communications.

In operation, the communication device 10 can include one or more applications that operate based on user data, such as user data from a peripheral device or user interface device integrated in communications device 10. Examples of these application include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 can include voice, audio, video and multimedia applications including Internet gaming, etc. The non-real-time data 24 can include text messaging, email, web browsing, file uploading and downloading, etc.

In an embodiment of the present invention, the communication device 10 includes a circuit, such as an RF integrated circuit that includes one or more features or functions of the present invention. Such circuits shall be described in greater detail in association with FIGS. 2-27 that follow.

Figure 2:
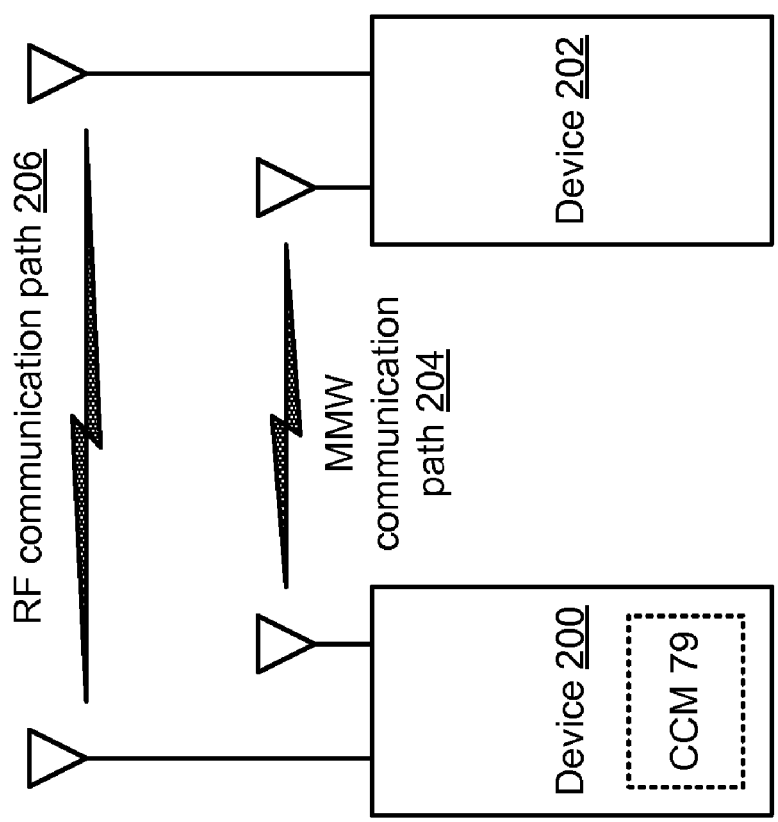
FIG. 2 is a schematic block diagram of an embodiment of another communication system in accordance with the present invention.

FIG. 2 is a schematic block diagram of an embodiment of another communication system in accordance with the present invention. In particular, device 200, such as communication device 10, communicates first data with a remote communication device 202 via RF communication path 206 that uses a first protocol. In addition, device 200 communicates second data with the device 202 via a millimeter wave communication path that uses a second protocol. Device 200 includes a communication control module 79 that coordinates the communication of the first data and the second data with the remote communication device to establish at least one parameter of the second protocol.

In an embodiment of the present invention, the RF communication path 206 is a standard communication path in a 800 Mhz, 900 MHz, 2.4 GHz, 5 Ghz or other frequency band, that operates as an 802.11, wireless telephony, WIMAX, UWB, or Bluetooth communication path that allows either direct communication between the devices 200 and 202 or indirect communications, via a base station, network, access point, relay or other indirect connection. The first data communicated via the RF communication path 206 can include data that establishes one or more the parameters of the protocol used to communicate via the millimeter wave communication path 204, such as a protocol selection, a modulation selection, a data rate selection, a channel selection, a security parameter, an antenna parameter, and a transmission power parameter.

In one example, first data is communicated via an RF communication path 206, such as a wireless local area network that operates via an 802.11 protocol in the 2.4 GHz frequency band. The first data is used to set-up a millimeter wave communication path in the 60 GHz frequency band for higher data rate communication, by setting or negotiating the set-up of the protocol, security parameters, such as the encryption scheme, modulation scheme, power level, etc. In addition, one or more of the protocol parameters, such as an encryption key, password, userID, maximum data rate, etc, can further be set, shared or negotiated via second data one the millimeter wave communication path 204 has been established on a initial, interim or preliminary basis.

Figure 3:
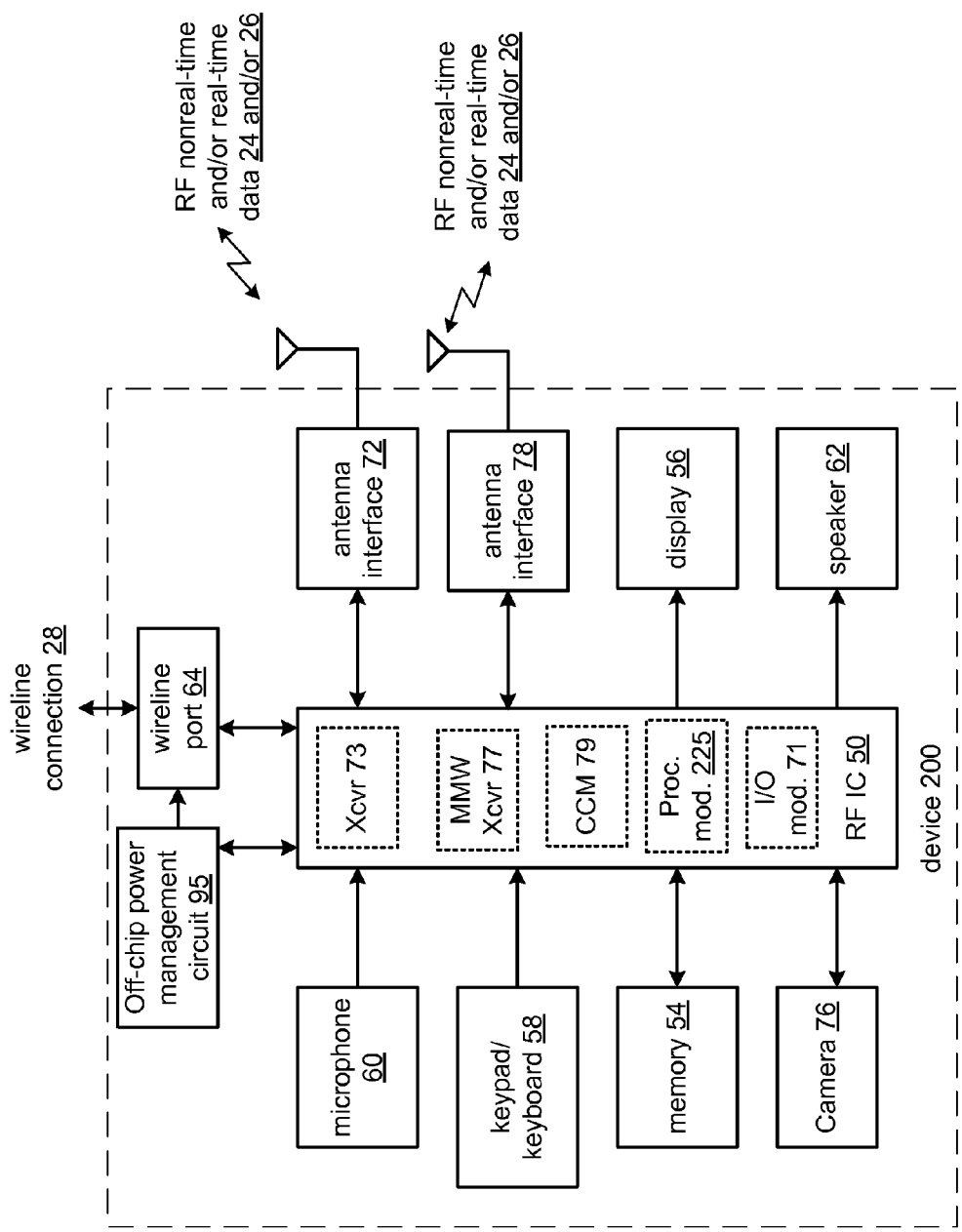
FIG. 3 is a pictorial diagram representation of a communication device in accordance with an embodiment of the present invention.

An example implementation of device 200 is presented in conjunction with FIG. 3 that follows.

FIG. 3 is a schematic block diagram of an embodiment of an integrated circuit in accordance with the present invention. In particular, an RF integrated circuit (IC) 50 is shown that implements communication device 10 and/or 200 in conjunction with microphone 60, keypad/keyboard 58, memory 54, speaker 62, display 56, camera 76, antenna interface 52 and wireline port 64. In addition, RF IC 50 includes a transceiver 73 with RF and baseband modules for formatting and modulating data into RF real-time data 26 and non-real-time data 24 and transmitting this data via an antenna interface 72 to one or more remote communication devices such as device 200, via RF communication path 206. RF IC 50 also includes an antenna, antenna interface 78 and millimeter wave transceiver 77 for communicating with an external device such as device 202 via a millimeter wave communication path 204. Further, RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the RF IC 50. RF IC 50 optionally includes an on-chip power management circuit for replacing the off-chip power management circuit 95.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the processing module 225 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 50 executes operational instructions that implement one or more of the applications (real-time or non-real-time) attributed to communication device 10 as discussed in conjunction with FIGS. 1-2. Further RF IC 50 includes communication control module 79 that coordinates the communication of data via the RF communication path 206 and the millimeter wave communication path 204 to, for instance, establish at least one parameter of the protocol used by the millimeter wave communication path 204. Communication management module 79 can be implemented in hardware via its own processing circuit, state machine, logic circuit or other device or via software or firmware that is executed via a shared or dedicated processor such as processing module 225 or other processing element.

Figure 4:
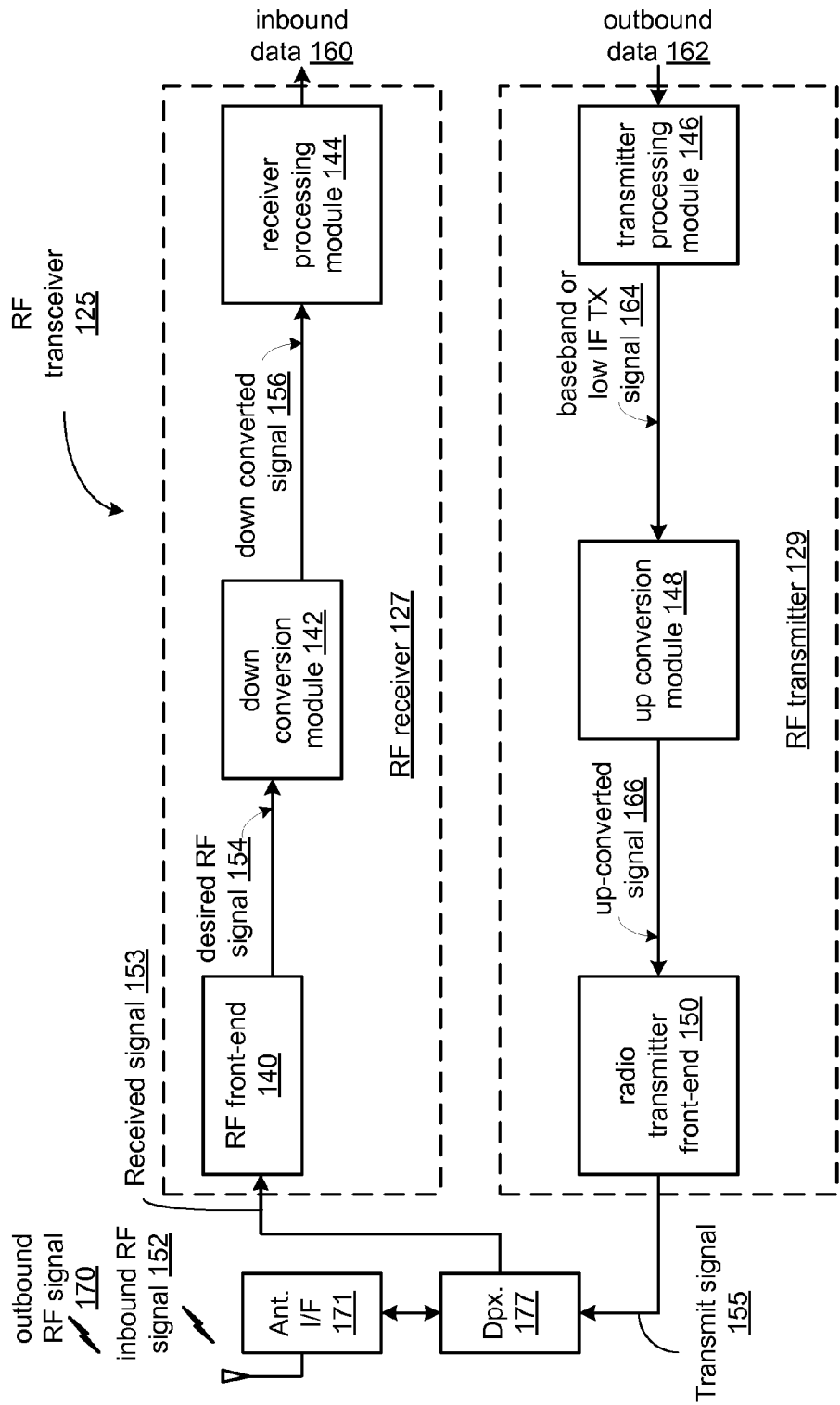
FIG. 4 is a schematic block diagram of an embodiment of an RF transceiver in accordance with the present invention.

FIG. 4 is a schematic block diagram of an RF transceiver 125, such as transceiver 73 or 77, which may be incorporated in communication device 10. The RF transceiver 125 includes an RF transmitter 129, an RF receiver 127 that operate in accordance with a wireless local area network protocol, a pico area network protocol, a wireless telephony protocol, a wireless data protocol, a millimeter wave protocol or other protocol. The RF receiver 127 includes a RF front end 140, a down conversion module 142, and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound RF signal 152 to produce received signal 153. While a single antenna is represented, the receiver and transmitter may each employ separate antennas or share a multiple antenna structure that includes two or more antennas. In another embodiment, the receiver and transmitter may share a multiple input multiple output (MIMO) antenna structure that includes a plurality of antennas. Each antenna may be fixed, programmable, an antenna array or other antenna configuration. Accordingly, the antenna structure of the wireless transceiver may depend on the particular standard(s) to which the wireless transceiver is compliant and the applications thereof.

In operation, the transmitter receives outbound data 162 from processor 225 or other or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

The radio transmitter front end 150 includes a power amplifier and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 can include, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 5:
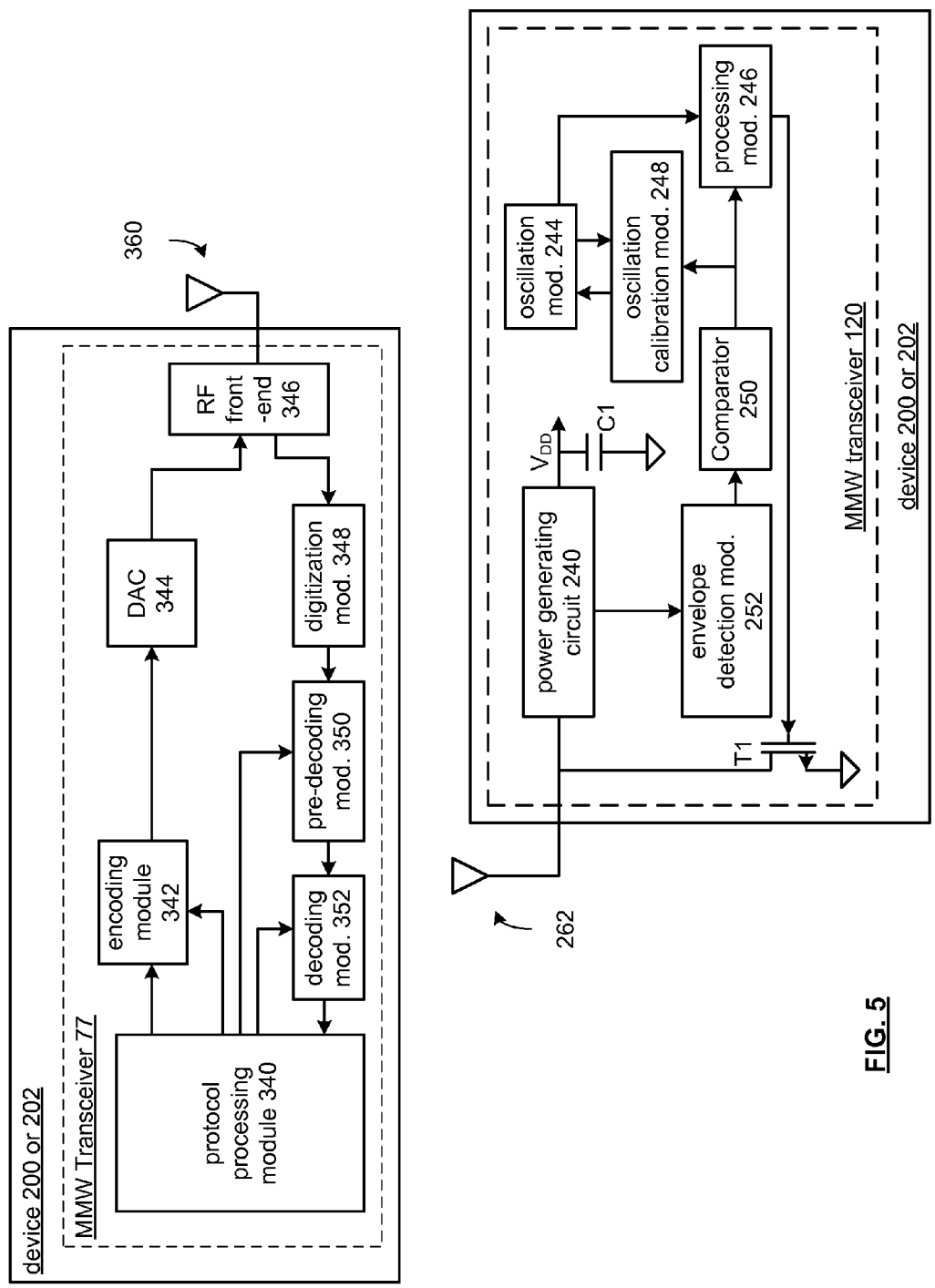
FIG. 5 is a schematic block diagram of another embodiment of millimeter wave transceivers in accordance with the present invention.

FIG. 5 is a schematic block diagram of an embodiment of millimeter wave transceivers in accordance with another embodiment of the present invention. In the particular embodiment, RFID technology is used to implement millimeter wave transceivers 77 and 120 for communication between two or more devices 200 and 202—with one device operating in a similar fashion to an RFID reader, and the other device operating similar to an RFID tag. As shown, millimeter wave transceiver 77 includes a protocol processing module 340, an encoding module 342, an RF front-end 346, a digitization module 348, a predecoding module 350 and a decoding module 352, all of which together form components of the millimeter wave transceiver 77. Millimeter wave transceiver 77 optionally includes a digital-to-analog converter (DAC) 344.

The protocol processing module 340 is operably coupled to prepare data for encoding in accordance with a particular RFID standardized protocol. In an exemplary embodiment, the protocol processing module 340 is programmed with multiple RFID standardized protocols or other protocols to enable the millimeter wave transceiver 77 to communicate with any device, regardless of the particular protocol associated with the device. In this embodiment, the protocol processing module 340 operates to program filters and other components of the encoding module 342, decoding module 352, predecoding module 350 and RF front end 346 in accordance with the particular RFID standardized protocol of the devices currently communicating with the millimeter wave transceiver 77. However, if devices 200 or 202 each operate in accordance with a single protocol, this flexibility can be omitted.

In operation, once the particular protocol has been selected for communication with one or more devices, such as device 200 or 202, the protocol processing module 340 generates and provides digital data to be communicated to a millimeter wave transceiver 120 to the encoding module 342 for encoding in accordance with the selected protocol. This digital data can include commands to power up the millimeter wave transceiver 120, to read user data or other commands or data used by the device in association with its operation. By way of example, but not limitation, the RFID protocols may include one or more line encoding schemes, such as Manchester encoding, FM0 encoding, FM1 encoding, etc. Thereafter, in the embodiment shown, the digitally encoded data is provided to the digital-to-analog converter 344 which converts the digitally encoded data into an analog signal. The RF front-end 346 modulates the analog signal to produce an RF signal at a particular carrier frequency that is transmitted via antenna 360 to one or more devices 200 or 202.

The RF front-end 346 further includes transmit blocking capabilities such that the energy of the transmitted RF signal does not substantially interfere with the receiving of a back-scattered or other RF signal received from one or more devices via the antenna 360. Upon receiving an RF signal from one or more devices, the RF front-end 346 converts the received RF signal into a baseband signal. The digitization module 348, which may be a limiting module or an analog-to-digital converter, converts the received baseband signal into a digital signal. The predecoding module 350 converts the digital signal into an encoded signal in accordance with the particular RFID protocol being utilized. The encoded data is provided to the decoding module 352, which recaptures data, such as user data 102 therefrom in accordance with the particular encoding scheme of the selected RFID protocol. The protocol processing module 340 processes the recovered data to identify the object(s) associated with the device(s) and/or provides the recovered data to the server and/or computer for further processing.

The processing module 340 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 40 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

Millimeter wave transceiver 120 includes a power generating circuit 240, an oscillation module 244, a processing module 246, an oscillation calibration module 248, a comparator 250, an envelope detection module 252, a capacitor C1, and a transistor T1. The oscillation module 244, the processing module 246, the oscillation calibration module 248, the comparator 250, and the envelope detection module 252 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 244, 246, 248, 250, 252 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the modules 244, 246, 248, 250, 252 implement one or more of their functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

In operation, the power generating circuit 240 generates a supply voltage ($V_{DD}$) from a radio frequency (RF) signal that is received via antenna 254. The power generating circuit 240 stores the supply voltage $V_{DD}$ in capacitor C1 and provides it to modules 244, 246, 248, 250, 252.

When the supply voltage $V_{DD}$ is present, the envelope detection module 252 determines an envelope of the RF signal, which includes a DC component corresponding to the supply voltage $V_{DD}$. In one embodiment, the RF signal is an amplitude modulation signal, where the envelope of the RF signal includes transmitted data. The envelope detection module 252 provides an envelope signal to the comparator 250. The comparator 250 compares the envelope signal with a threshold to produce a stream of recovered data.

The oscillation module 244, which may be a ring oscillator, crystal oscillator, or timing circuit, generates one or more clock signals that have a rate corresponding to the rate of the RF signal in accordance with an oscillation feedback signal. For instance, if the RF signal is a 60 GHz signal, the rate of the clock signals will be n*60 GHz, where "n" is equal to or greater than 1.

The oscillation calibration module 248 produces the oscillation feedback signal from a clock signal of the one or more clock signals and the stream of recovered data. In general, the oscillation calibration module 248 compares the rate of the clock signal with the rate of the stream of recovered data. Based on this comparison, the oscillation calibration module 248 generates the oscillation feedback to indicate to the oscillation module 244 to maintain the current rate, speed up the current rate, or slow down the current rate.

The processing module 246 receives the stream of recovered data and a clock signal of the one or more clock signals. The processing module 246 interprets the stream of recovered data to determine a command or commands contained therein. The command may be to store data, update data, reply with stored data, verify command compliance, read user data, an acknowledgement, etc. If the command(s) requires a response, the processing module 246 provides a signal to the transistor T1 at a rate corresponding to the RF signal. The signal toggles transistor T1 on and off to generate an RF response signal that is transmitted via the antenna. In one embodiment, the millimeter wave transceiver 120 utilizes a back-scattering RF communication to send data that includes user data.

The millimeter wave transceiver 120 may further include a current reference (not shown) that provides one or more reference, or bias currents to the oscillation module 244, the oscillation calibration module 248, the envelope detection module 252, and the comparator 250. The bias current may be adjusted to provide a desired level of biasing for each of the modules 244, 248, 250, and 252.

Figure 6:
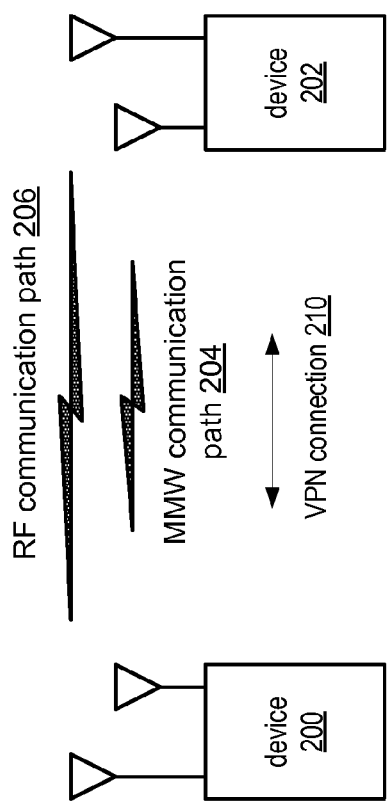
FIG. 6 is a schematic block diagram of an embodiment of another communication system in accordance with the present invention.

FIG. 6 is a schematic block diagram of an embodiment of another communication system in accordance with the present invention. In particular a communication system is shown that uses similar elements from FIGS. 2-5 that are referred to by common reference numerals. In this embodiment of the present invention, device 200, via its communication control module 79, coordinates the communication of first data via the RF communication path 206 and second data via the millimeter wave communication path 204 to establish a virtual private network connection 210 between the device 200 and the remote communication device 202.

As previously discussed the RF communication path 206 can be a wireless local area network, a wireless piconet, a wireless telephony network or other wireless network. In an embodiment of the present invention, the first data includes a request to establish a virtual private network connection between the device 200 and the device 202 via millimeter wave signaling over the millimeter wave communication path. In response, data can be exchanged between the devices 200 and 202 via the RF communication path 206 to establish one or more the parameters of the protocol used to for the virtual private network connection 210, such as a protocol selection, a modulation selection, a data rate selection, a channel selection, a security parameter, an antenna parameter, and a transmission power parameter.

In one example, first data is communicated via an RF communication path 206, such as a wireless local area network that operates via an 802.11 protocol in the 2.4 GHz frequency band. The first data is used to set-up a virtual private network connection 210 by setting or negotiating the set-up of the protocol, security parameters, such as the encryption scheme, modulation scheme, power level, etc. of the millimeter wave communication path 204. In addition, one or more of the protocol parameters, such as an encryption key, password, userID, maximum data rate, etc, can further be set, shared or negotiated via second data once the millimeter-wave communication path 204 has been established on a initial, interim or preliminary basis.

Figure 7:
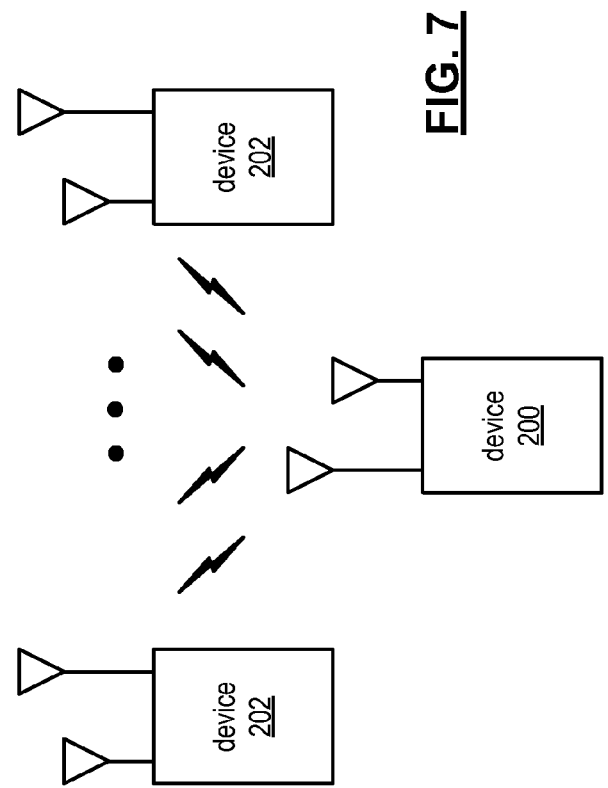
FIG. 7 is a schematic block diagram of an embodiment of another communication system in accordance with the present invention.

FIG. 7 is a schematic block diagram of an embodiment of another communication system in accordance with the present invention. In particular a communication system is shown that uses similar elements from FIGS. 2-6 that are referred to by common reference numerals. In this embodiment of the present invention, device 200, via its communication control module 79, coordinates the communication of first data via the RF communication path 206 and second data via the millimeter wave communication path 204 to establish a local area network connection 210 between the device 200 and a plurality of remote communication devices 202.

In an embodiment of the present invention, the local area network communications are shared between the RF communications path 206 and the millimeter wave communication path 204. As discussed in conjunction with FIG. 2, the millimeter wave communications path 206 can be established in part via data transmitted over the RF communication path 204. As discussed in conjunction with FIG. 6, the millimeter wave communication path can carry a virtual private network connection. Communication control module 79 can be used to coordinate local area network communications via both the RF communications path 206 and the millimeter wave communication path 204 based on the type of data being transmitted. For example, high data rate communications such as streaming video, high speed network downloads or other high speed data applications can be communicated via the millimeter wave communication path 204 when available and then RF communication path 206 can be used for lower data rate communications or when the millimeter wave communications are out of range or otherwise unavailable between devices 200, 202. For example, secure data can be communicated over a virtual private network connection via the millimeter wave communication path 204 when available and then RF communication path 206 can be used for unsecured communications.

In a further embodiment of the present invention, communication control module 79 of device 200 can arbitrate communication between at least two of the plurality of remote communication devices 202. For example, device 200 can receives a millimeter wave access request from one of the plurality of remote communication devices via the first data sent via the RF communication path 206. In response communication control module can determines millimeter wave resource availability based on, for instance an evaluation of current or planned usage and, when sufficient millimeter wave resources are available to fulfill the millimeter wave access request, allocate at least one millimeter wave resource, such as a frequency channel, or time slot to the device 202 that made the millimeter wave access request. In particular, the communication control module 79 can generate first data and command the device 200 to send an allocation confirmation message to the device 202 that initiated the request, via the first data.

In another embodiment of the present invention, device 200 can receives a millimeter wave access request from one of the plurality of remote communication devices via the second data sent via the millimeter wave communication path 204. In response communication control module can determines millimeter wave resource availability based on, for instance an evaluation of current or planned usage and, when sufficient millimeter wave resources are available to fulfill the millimeter wave access request, allocate at least one millimeter wave resource, such as a frequency channel, or time slot to the device 202 that made the millimeter wave access request. In particular, the communication control module 79 can generate second data and command the device 200 to send an allocation confirmation message to the device 202 that initiated the request, via the second data.

While the local area network communications is described above as sharing the RF communications path 206 and the millimeter wave communication path 204. In a further embodiment, the local area network connection is conducted exclusively via the millimeter wave communication path 204. In this fashion, devices 200 and 202 can operate a separate local area network that, once established, is independent of communications sent via RF communications path 206.

Figure 8:
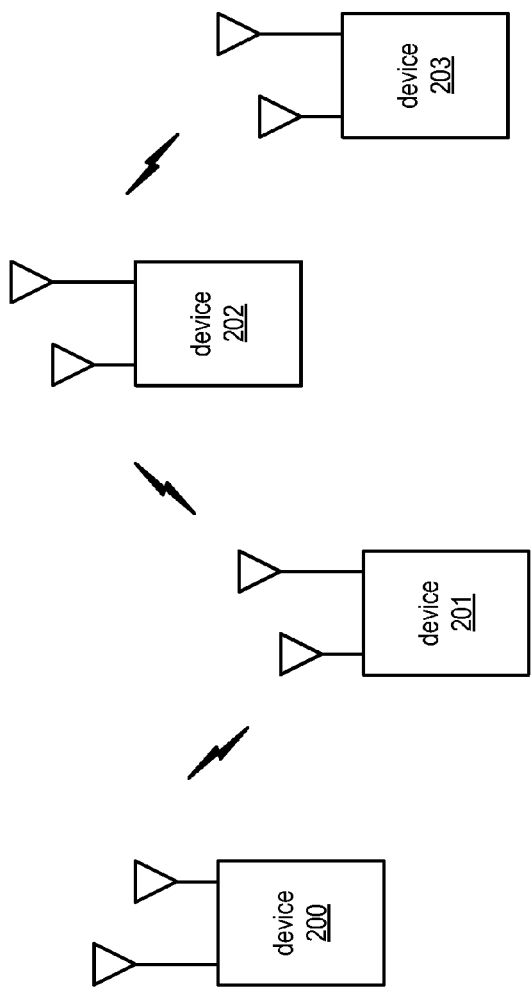
FIG. 8 is a schematic block diagram of an embodiment of another communication system in accordance with the present invention.

FIG. 8 is a schematic block diagram of an embodiment of another communication system in accordance with the present invention. In particular a communication system is shown that uses similar elements from FIGS. 2-7 that are referred to by common reference numerals. In this embodiment of the present invention, device 200, via its communication control module 79, coordinates the communication of first data via the RF communication path 206 and second data via the millimeter wave communication path 204 to establish a mesh network between the device 200 and a plurality of remote communication devices 201-203.

In this configuration, one or more of the devices 200-203 can operate as a relay to relay a communication from one device to another. For instance, a communication between device 200 and 202 could be relayed via device 201 if devices 200 and 202 were not in direct communication with one another. In a similar fashion, a communication between device 201 and 203 could be relayed via device 202, and a communication between device 200 and 203 could be relayed via devices 201 and 202.

In an embodiment of the present invention, the mesh network communications are shared between the RF communications path 206 and the millimeter wave communication path 204. As discussed in conjunction with FIG. 2, the millimeter wave communications path 206 can be established in part via data transmitted over the RF communication path 204. As discussed in conjunction with FIG. 6, the millimeter wave communication path can carry a virtual private network connection. Communication control module 79 can be used to coordinate local area network communications via both the RF communications path 206 and the millimeter wave communication path 204 based on the type of data being transmitted. For example, high data rate communications such as streaming video, high speed network downloads or other high speed data applications can be communicated via the millimeter wave communication path 204 when available and then RF communication path 206 can be used for lower data rate communications or when the millimeter wave communications are out of range or otherwise unavailable between devices 200, 202. For example, secure data can be communicated over a virtual private network connection via the millimeter wave communication path 204 when available and then RF communication path 206 can be used for unsecured communications.

In addition, portions of a multi-hop communication can be relayed via different communication paths. For instance, a data packet sent from device 200 to device 202 can be sent to device 201 via the millimeter wave communication path 204 via the second protocol. In device 201, the data packet can be reformatted in the first protocol. For instance, the data packet can be tunneled in the first protocol or carried in the payload of the first protocol and transmitted to the device 202.

In a further embodiment of the present invention, acknowledgements are used to confirm transmissions. These acknowledgements can be sent exclusively via the millimeter wave communication path 204 or the RF communication path 206 or via whichever communication path is available for each hop. For instance, a data packet sent from device 200 to device 202 can be relayed via device 201. Once received by device 202, device 202 can initiate an acknowledgement message back to device 200 via device 201 to acknowledge the packet was correctly received. In this implementation, device 200 can attempt to resend the original packet if such an acknowledge message is not received. In a particular implementation, the original packet can be sent via the millimeter wave communication path 204 while acknowledgement messages are sent via the RF communication path 206. This configuration is useful when, for instance, the millimeter wave communication path 204 is secured, while the RF communication path 206 is unsecured. In this fashion, the secured link can be used to send payload data, while he unsecured link is used to transit control messages such as the acknowledgement messages or other control signaling.

While the mesh network communications are described above as sharing the RF communications path 206 and the millimeter wave communication path 204, in a further embodiment, the mesh network can be conducted exclusively via the millimeter wave communication path 204. In this fashion, devices 200-203 can operate a separate mesh network that, once established, is independent of communications sent via RF communications path 206.

In an embodiment of the present invention, each of the devices 200-203 includes a communication control module, such as communication control module 79, that generates a routing table that includes possible routes for communication between itself and other devices. When a new device joins the mesh, it generates its own direct routing table by either sending out beacons or other test messages and receiving responses from other devices, or by receiving beacons or other test messages from these devices. In response the new device further receives a routing table from other devices in direct communication and uses this to build a final routing table that includes both direct communication and indirect communication.

Consider the following example, where an existing mesh network exists between devices 201-203 and where each device can only communicate directly with its nearest neighbor. Each device has its own routing table. For instance, device 201 has a routing table as follows that indicates that communications with device 202 can be conducted directly, but communications with device 203 must be relayed via device 202.

| Device 201 | | |
|---|---|---|
| Device | Relay1 | Relay2 |
| 202 | | |
| 203 | 202 | |

Similarly, devices 202 and 203 have routing tables as follows.

| Device 202 | | |
|---|---|---|
| Device | Relay1 | Relay2 |
| 201 | | |
| 203 | | |

| Device 203 | | |
|---|---|---|
| Device | Relay1 | Relay2 |
| 202 | | |
| 201 | 202 | |

When device 200 joins the mesh it establishes a preliminary routing table that includes those devices that are in direct communication as follows:

| Device 200 | | |
|---|---|---|
| Device | Relay1 | Relay2 |
| 201 | | |

This information is shared with other devices in the mesh in direct communication, in this case only device 201. In response, device 201 updates its routing table, and shares this routing table with the other devices in direct communication, in this case devices 200 and 202 and so on until all the devices in the mesh are updated. This can be an iterative process. As a result, each of the devices 200-203 has an updated routing table as follows.

| Device 200 | | |
|---|---|---|
| Device | Relay1 | Relay2 |
| 201 | | |
| 202 | 201 | |
| 203 | 201 | 202 |

| Device 201 | | |
|---|---|---|
| Device | Relay1 | Relay2 |
| 202 | | |
| 203 | 202 | |
| 200 | | |

| Device 202 | | |
|---|---|---|
| Device | Relay1 | Relay2 |
| 201 | | |
| 203 | | |
| 200 | 201 | |

| Device 203 | | |
|---|---|---|
| Device | Relay1 | Relay2 |
| 202 | | |
| 201 | 202 | |
| 200 | 202 | 201 |

After the routing tables have been updated under control of the communication control module 79 of each device, the communication control module 79 of each device in the mesh network can determine a routing for communication with each other device in the mesh. Packets/frames of data can be formatted for routing to a particular device based on a source identifier and a destination identifier, an optionally based on one or more a relay identifiers included in the header of the packet/frame. When a packet is received by a device 200-203, the destination identifier is checked to see if the packet/frame is directed to that particular device. If so, an acknowledgement message can be generated and sent back to the source device. If however, one or more of the relay identifiers matches the device that receives the packet/frame, the packet/frame is retransmitted along the path to the destination, based on either the routing information in the packet/frame or based on the devices own routing table.

While the foregoing example has discussed the formation of a mesh network based on routing tables maintained by each of the devices 200-203 in the mesh, an ad hoc mesh network can likewise be established whereby each device simply retransmits packets received that are not addressed to it, while optionally appending a relay identifier to the packet header to provide return routing information for the packet/frame.

While the example of a linear mesh is shown in FIG. 8, more complex patterns with multiple redundant routes between devices are possible. In this fashion, if a communication control module 79 is faced with multiple routes to a particular device, it can default to the shortest route, but use alternative routes if acknowledgments are not received.

Figure 9:
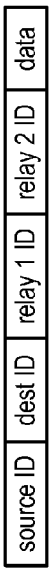
FIG. 9 is a block diagram representation of a data frame in accordance with the present invention.
Figure 10:
FIG. 10 is a block diagram representation of another data frame in accordance with the present invention.
Figure 11:
FIG. 11 is a block diagram representation of another data frame in accordance with the present invention.

FIGS. 9-11 present block diagram representations of several data frames in accordance with the present invention. In particular, data frames or packets 220, 222 and 224 are presented that each include: a source identifier that includes an address or other designation for the particular device that originated the packet or frame; a destination identifier that includes an address or other designation for the particular device that is meant to receive the packet or frame; a data section that includes the data payload of the packet or frame; and optional relay identifiers that includes an address or other designation for the particular device or devices that either are intended to relay the packet or frame or that actually do relay the packet or frame. While a particular data structure is shown, additional control data, such as error correcting codes, error detecting codes, packet preambles, and other control information can likewise be included.

FIG. 12 is a graphical representation of a device list in accordance with the present invention. In particular, an example device list 228 is shown that can be used by devices 200-203 and that can be complied and stored in a communication control module, such as communication control module 79. The communications control module 79 further stores registration information gathered via pairing or other registration procedure, corresponding to a plurality of registered remote communication devices. In further operation, the communication control module 79 can compare the list of the plurality of remote communication device in direct or indirect communication with the device to the plurality of registered remote communication devices to indicate on the list which registered devices are present—currently available via direct or indirect communication and which devices are either turned off, out of range or otherwise unavailable.

The example device list 228 includes a list of devices (A, B, C, D). The list 228 identifies which of the devices are available by direct communication (A, B) and via which communication links. The list further identifies which of the devices are available by indirect communication (C), which devices are been registered (C, D) and which registered devices are not available (D). This list can be displayed to the user of a device, such as device 200 via a graphical interface device such as a display 56. While not shown, devices connected via an optional wireline connection, such as wireline connection 28 can likewise be displayed in a similar fashion along with the particular wireline connection mode, USB, Firewire, SCSI, PCMCIA, etc.

FIG. 13 is a schematic block diagram of an embodiment of another communication system in accordance with the present invention. In particular, a communication system is shown that includes a plurality of devices A, B, N and an access point (AP), such as real-time or non-real-time devices 18, 20, 25, communication device 10, devices 200-203, etc. Each device includes a graphical interface device, such as a touch screen or other display, such as display 56, for displaying a list of devices, such as list 228. Graphical user interface can be used for selecting a device to communicate with and a particular mode of communication and/or communication path, based on the actions of a user.

Figure 14:
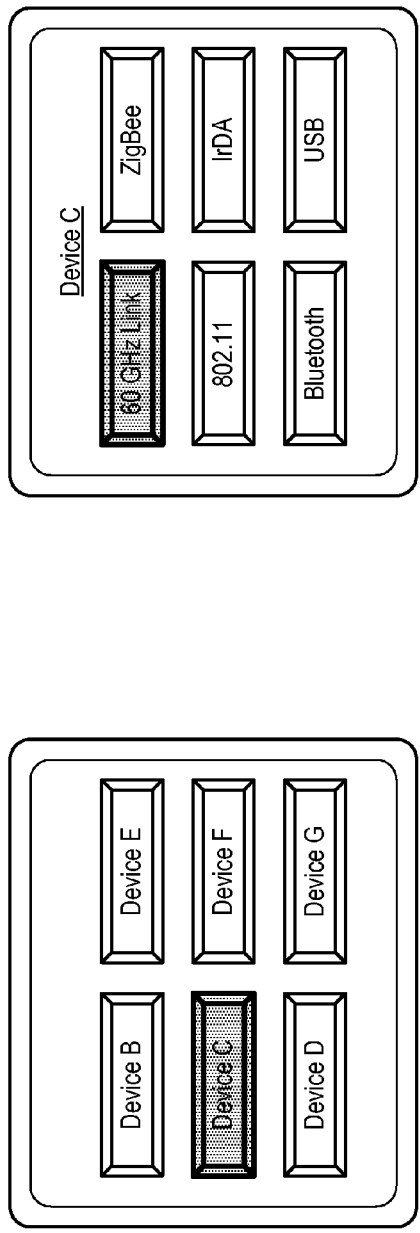
FIG. 14 is a graphical representation of a screen display in accordance with the present invention.

FIG. 14 is a graphical representation of a screen display in accordance with the present invention. In particular a screen display is shown for a device, such as device A of FIG. 13, that includes a list of devices that are either in direct or indirect communication. As shown, each of these devices B, C, D, E, F, G are represented by an icon. In an embodiment of the present invention, the display is a touch screen that responds by the first touch of a particular icon my highlighting that particular icon. As shown, the icon corresponding to Device C has been highlighted. A second touch by the user of this icon results in the selection of this particular device (Device C) for communication.

Figure 15:
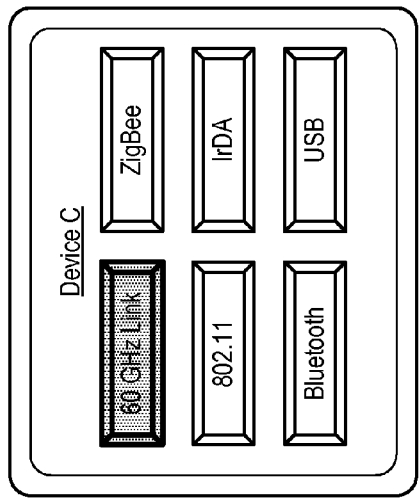
FIG. 15 is a graphical representation of another screen display in accordance with the present invention.

FIG. 15 is a graphical representation of another screen display in accordance with the present invention. In particular a screen display is shown for a device, such as device A of FIGS. 13-14, that includes a list of communication links that are available to communicate with a particular device. Following along with the example presented in conjunction with FIG. 14, after Device C has been selected, a plurality of icons represent various communication links available for communicating with Device C. In an embodiment of the present invention, the display is a touch screen that responds by the first touch of a particular icon my highlighting that particular icon. As shown, the icon corresponding to a 60 GHz link, such millimeter wave communication path 204, has been highlighted. A second touch by the user of this icon results in the selection of this particular communication link for communication between Device A and Device C.

Figure 16:
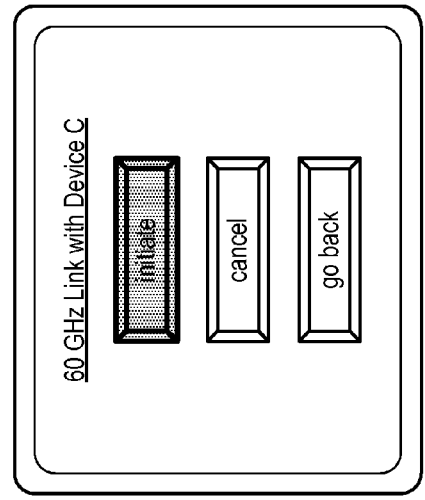
FIG. 16 is a graphical representation of another screen display in accordance with the present invention.

FIG. 16 is a graphical representation of another screen display in accordance with the present invention. In particular a screen display is shown for a device, that follows along with the example presented in conjunction with FIGS. 14-15. In this case, a plurality of icons represent various actions that a user of Device A can initiate for 60 GHz communications with Device C, such as to initiate communications, cancel the communication and to optionally go back to the prior screen. In an embodiment of the present invention, the display is a touch screen that responds by the first touch of a particular icon my highlighting that particular icon. As shown, the icon corresponding to initiating the 60 GHz link has been highlighted. A second touch by the user of this icon results in the initiation of this particular communication link for communication between Device A and Device C.

FIG. 17 is a pictorial diagram representation of a communication device and peripheral in accordance with an embodiment of the present invention. In particular, communications device 200 is shown that is implemented via a mobile telephone or other mobile wireless communication device that is capable of communication via two or more communication paths, such as RF communication path 206 and millimeter wave communication path 204 with a plurality of remote communication devices such as such as printer 7, computer 9, keyboard 11, keypad 13, touchpad 15, pointing device 17 and headset 19 or other is real-time or non-real-time devices. In an embodiment of the present invention communication device 200, via communication control module 79 coordinates the communication of the first data via the RF communication path 206 in accordance with a first protocol and second data via millimeter wave communication path 204 in accordance with a second protocol.

In one mode of operation, communication control module 79 facilitates communication between at least two of the plurality of remote communication devices. In particular, communication control module 79 can receive a request from one of the plurality of remote communication devices via the first data and determine resource availability from a second remote communication device, such as data from that device received via either RF communications path 206 of millimeter wave communications path 204 that indicates the device is inactive or otherwise available to fulfill the request. When the second remote communication device is available to fulfill the request, communication control module 79 facilitates the communication between the first and second remote communication devices. In particular, the communication control module can facilitate the communication between the two remote communication devices by converting first data received from the first remote communication devices to second data relayed to the secondremote communication devices. Further, the communication control module 79 can send an allocation confirmation message to the first remote communication devices via the first or second data.

In another mode of operation, communication control module 79 can receive a request from one of the plurality of remote communication devices via the second data and determine resource availability from a second remote communication device, such as data from that device received via either RF communications path 206 of millimeter wave communications path 204 that indicates the device is inactive or otherwise available to fulfill the request. When the second remote communication device is available to fulfill the request, communication control module 79 facilitates the communication between the first and second remote communication devices. In particular, the communication control module can facilitate the communication between the two remote communication devices by converting second data received from the first remote communication devices to first data relayed to the second remote communication devices. Further, the communication control module 79 can send an allocation confirmation message to the first remote communication devices via the first or second data.

Figure 18:
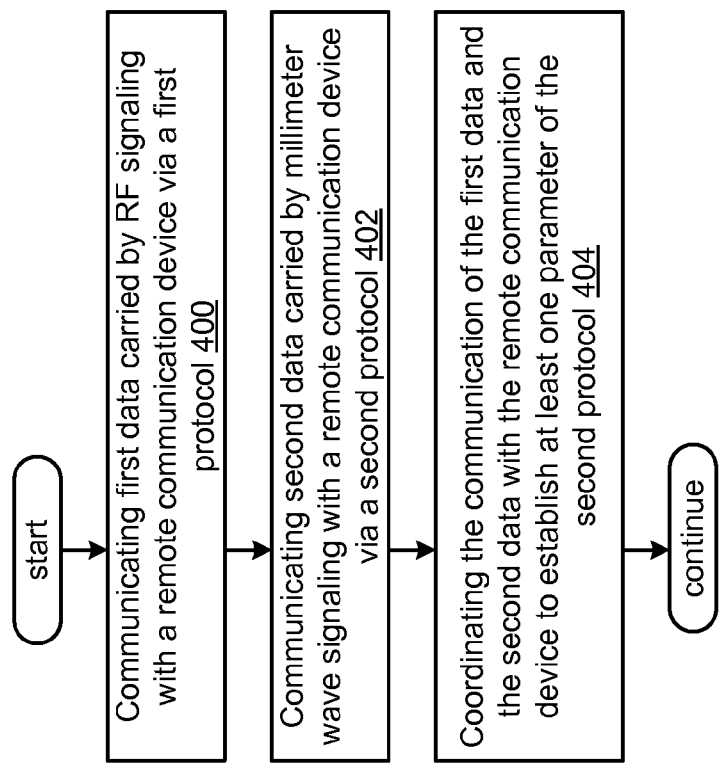
FIG. 18 is a flow chart of an embodiment of a method in accordance with the present invention.

FIG. 18 is a flowchart representation of a method in accordance with an embodiment of the present invention. In particular, a method is presented for use with one or more functions and features presented in conjunction with FIGS. 1-17. In step 400, first data carried by RF signaling is communicated with a remote communication device via a first protocol. In step 402, second data carried by millimeter wave signaling is communicated with the remote communication device via a second protocol. In step 404, the communication of the first data and the second data with the remote communication device is coordinated to establish at least one parameter of the second protocol.

In an embodiment of the present invention, the first protocol includes at least one of: a wireless local area network protocol; a wireless piconet protocol; and a wireless telephony protocol. The first data can include a request to establish communication between the communication device and the remote communication device via millimeter wave signaling. The first data can include the at least one parameter of the second protocol. The at least one parameter can include a protocol selection, a modulation selection, a data rate selection, a security parameter, an antenna parameter, a transmission power parameter and/or a channel selection.

The first data can be communicated at a first data rate and the second data can be communicated at a second data rate that is higher than the first data rate. Step 404 can include negotiating the selection of a plurality of parameters of the second protocol via the first data.

Figure 19:
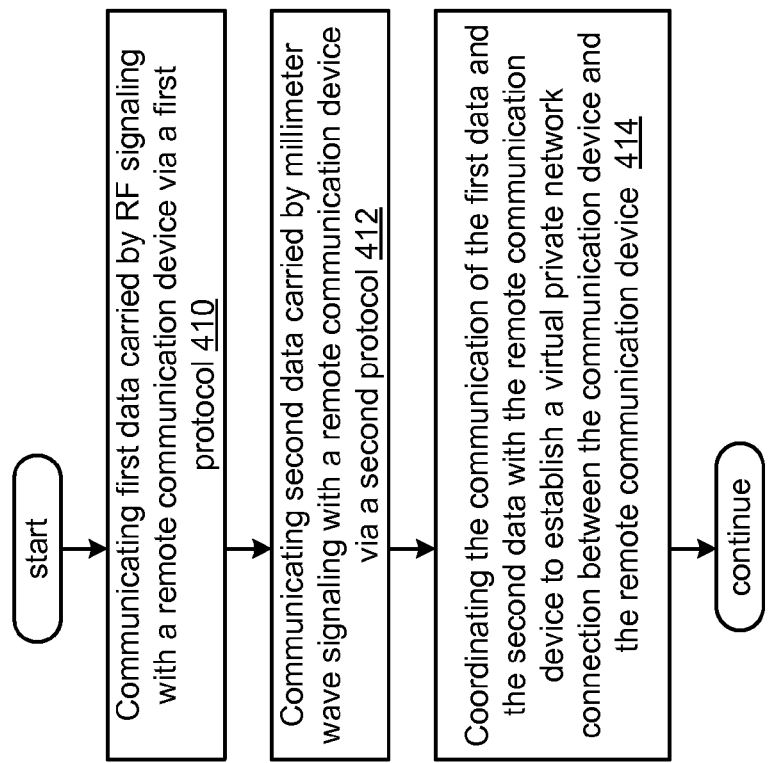
FIG. 19 is a flow chart of an embodiment of a method in accordance with the present invention.

FIG. 19 is a flowchart representation of a method in accordance with an embodiment of the present invention. In particular, a method is presented for use with one or more functions and features presented in conjunction with FIGS. 1-18. In step 410, first data carried by RF signaling is communicated with a remote communication device via a first protocol. In step 412, second data carried by millimeter wave signaling is communicated with the remote communication device via a second protocol. In step 414, the communication of the first data and the second data with the remote communication device is coordinated to establish a virtual private network connection between the communication device and the remote communication device.

In an embodiment of the present invention the first protocol includes at least one of: a wireless local area network protocol; a wireless piconet protocol; and a wireless telephony protocol. The first data can further include a request to establish a virtual private network connection between the communication device and the remote communication device via millimeter wave signaling and at least one parameter of the second protocol. The at least one parameter can include a protocol selection, a modulation selection, a data rate selection, a security parameter, an encryption parameter, transmission power parameter and/or a channel selection. The first data can be communicated at a first data rate and the second data can be communicated at a second data rate that is higher than the first data rate. Step 414 can include negotiating the selection of a plurality of parameters of the second protocol via the first data.

FIG. 20 is a flowchart representation of a method in accordance with an embodiment of the present invention. In particular, a method is presented for use with one or more functions and features presented in conjunction with FIGS. 1-19. In step 420, first data is communicated with at least one of a plurality of remote communication devices via a first protocol and a first frequency band. In step 422, second data is communicated with at least one of the plurality of remote communication devices via a second protocol and a second frequency band. In step 424, the communication of the first data and the second data with the at least one of the plurality of remote communication devices is coordinated. In step 426, a local area network connection is established between the communication device and the plurality of remote communication devices.

In an embodiment of the present invention, the first protocol includes at least one of: a wireless local area network protocol; a wireless piconet protocol; and a wireless telephony protocol. The local area network connection can be conducted exclusively via the second frequency band. The local area network connection can be conducted via the first frequency band and the second frequency band. The second frequency band can include a 60 GHz band.

FIG. 21 is a flowchart representation of a method in accordance with an embodiment of the present invention. In particular, a method is presented for use with one or more functions and features presented in conjunction with FIGS. 1-20. In step 430, communication between at least two of the plurality of remote communication devices is arbitrated.

Step 430 can include receiving an millimeter wave access request from one of the plurality of remote communication devices via the first data; determining millimeter wave resource availability; and when sufficient millimeter wave resources are available to fulfill the millimeter wave access request, allocating at least one millimeter wave resource in response to the millimeter wave access request. Step 430 can include sending an allocation confirmation message to the one of the plurality of remote communication devices via the first data. Step 430 can include receiving an millimeter wave access request from one of the plurality of remote communication devices via the second data; determining millimeter wave resource availability; and when sufficient millimeter wave resources are available to fulfill the millimeter wave access request, allocating at least one millimeter wave resource in response to the millimeter wave access request. Step 430 can include sending an allocation confirmation message to the one of the plurality of remote communication devices via the second data.

FIG. 22 is a flowchart representation of a method in accordance with an embodiment of the present invention. In particular, a method is presented for use with one or more functions and features presented in conjunction with FIGS. 1-21. In step 440, first data is communicated with at least one of a plurality of remote communication devices via a first protocol and a first frequency band. In step 442, second data is communicated with at least one of the plurality of remote communication devices via a second protocol and a second frequency band. In step 444 the communication of the first data and the second data with the at least one of the plurality of remote communication devices is coordinated. And in step 446, a mesh network is established between the communication device and the plurality of remote communication devices.

In an embodiment of the present invention, the first protocol includes at least one of: a wireless local area network protocol; a wireless piconet protocol; and a wireless telephony protocol. Step 446 can include generating a routing table that includes possible routes for communication between the communication device and the plurality of remote communication devices. The possible routes can include direct routes and/or indirect routes including at least one relay point. The second protocol can include a source identifier and a destination identifier at least one relay identifier. The second protocol can operate in accordance with acknowledgement messages to confirm delivery. The mesh network can be conducted exclusively via the second frequency band or conducted via the first frequency band and the second frequency band. The second frequency band can include a 60 GHz band.

FIG. 23 is a flowchart representation of a method in accordance with an embodiment of the present invention. In particular, a method is presented for use with one or more functions and features presented in conjunction with FIGS. 1-22. In step 450, first data is communicated with at least one of a plurality of remote communication devices via a first protocol and a first frequency band in a first mode of operation. In step 452, second data is communicated with at least one of the plurality of remote communication devices via a second protocol and a second frequency band in a second mode of operation. In step 454, the communication of the first data and the second data is coordinated with the at least one of the plurality of remote communication devices. In step 456, at least one of the plurality of remote communication devices is graphically selected based on actions of a user. In step 458, at least one of the first mode of operation and the second mode of operation, is graphically selected based on the actions of the user.

FIG. 24 is a flowchart representation of a method in accordance with an embodiment of the present invention. In particular, a method is presented for use with one or more functions and features presented in conjunction with FIGS. 1-23. In step 460, a list of the plurality of remote communication devices is generated and step 456 of FIG. 23 can includes displaying the list of the plurality of remote communication devices.

Displaying the list can include displaying the list of the plurality of remote communication devices as a plurality of icons corresponding to the plurality of remote communication devices and step 456 can include receiving user input via a touch screen. The list of the plurality of remote communication devices can indicate a first subset of the plurality of remote communication devices available by direct communication and a second subset of the plurality of remote communication devices available by indirect communication. The list of the plurality of remote communication devices can indicate a first subset of the plurality of remote communication devices available via communications in the first frequency band and a second subset of the plurality of remote communication devices available via the second frequency band.

FIG. 25 is a flowchart representation of a method in accordance with an embodiment of the present invention. In particular, a method is presented for use with one or more functions and features presented in conjunction with FIGS. 1-17. In step 470, registration information is stored corresponding to a plurality of registered remote communication devices. In step 472, the list of the plurality of remote communication device is compared to the plurality of registered remote communication devices. A list of the plurality of remote communication devices indicates a subset of the plurality of remote communication devices that are included in the registered remote communication devices and/or not included in the registered remote communication devices.

Figure 26:
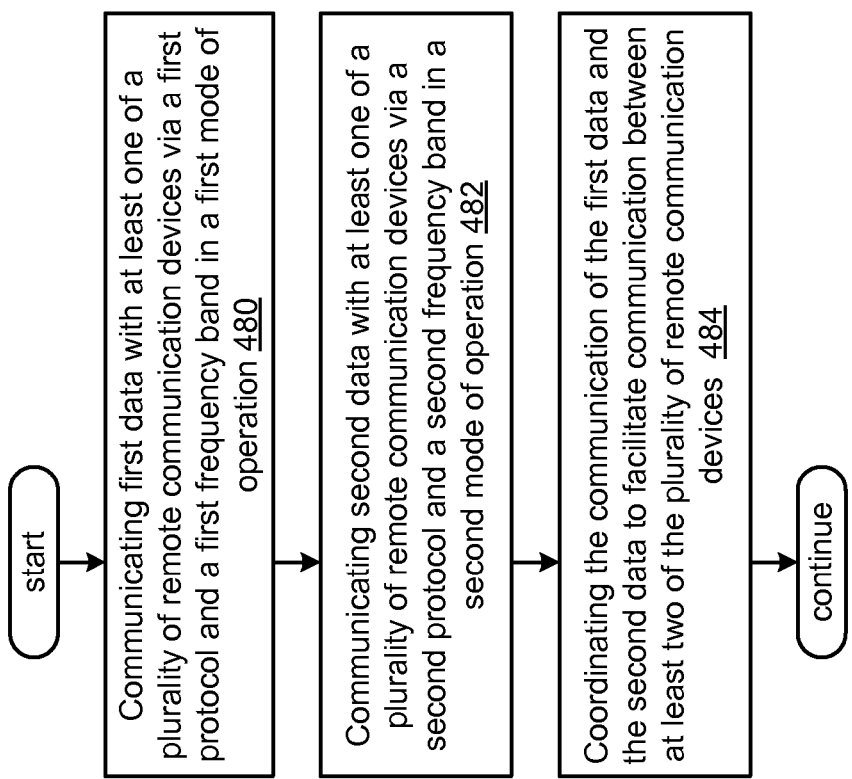
FIG. 26 is a flow chart of an embodiment of a method in accordance with the present invention.

FIG. 26 is a flowchart representation of a method in accordance with an embodiment of the present invention. In particular, a method is presented for use with one or more functions and features presented in conjunction with FIGS. 1-25. In step 480, first data is communicated with at least one of a plurality of remote communication devices via a first protocol and a first frequency band in a first mode of operation. In step 482, second data is communicated with at least one of the plurality of remote communication devices via a second protocol and a second frequency band in a second mode of operation. In step 484, the communication of the first data and the second data is coordinated to facilitate communication between at least two of the plurality of remote communication devices.

In an embodiment of the present invention, the first protocol includes at least one of: a wireless local area network protocol; a wireless piconet protocol; and a wireless telephony protocol. Step 484 can include receiving a request from one of the plurality of remote communication devices via the first data; determining resource availability from another of the plurality of remote communication devices; and when another of the plurality of remote communication devices are available to fulfill the request, facilitating communication between the one of the plurality of remote communication devices and the another of the plurality of remote communication devices. Step 484 can include facilitating the communication between the one of the plurality of remote communication devices and the another of the plurality of remote communication devices by converting first data received from the one of the plurality of remote communication devices to second data relayed to the another of the plurality of remote communication devices. Step 484 can include sending an allocation confirmation message to the one of the plurality of remote communication devices via the first data.

Step 484 can include receiving a request from one of the plurality of remote communication devices via the second data; determining resource availability from another of the plurality of remote communication devices; and when another of the plurality of remote communication devices are available to fulfill the request, facilitating the communication between the one of the plurality of remote communication devices and the another of the plurality of remote communication devices. Step 484 can include facilitating the communication between the one of the plurality of remote communication devices and the another of the plurality of remote communication devices by converting second data received from the one of the plurality of remote communication devices to first data relayed to the another of the plurality of remote communication devices. Step 484 can include sending an allocation confirmation message to the one of the plurality of remote communication devices via the second data.

Figure 27:
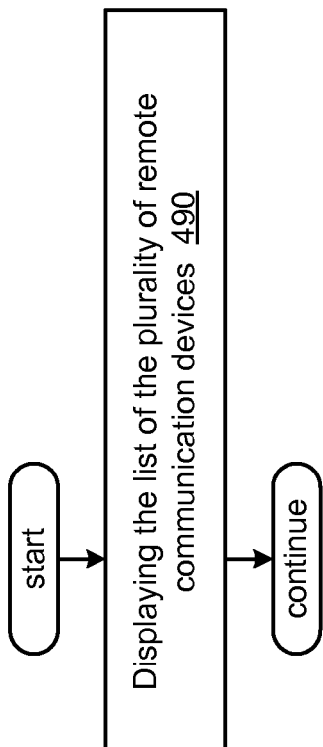
FIG. 27 is a flow chart of an embodiment of a method in accordance with the present invention.

FIG. 27 is a flowchart representation of a method in accordance with an embodiment of the present invention. In particular, a method is presented for use with one or more functions and features presented in conjunction with FIGS. 1-26. Step 490 can be used when a list of the plurality of remote communication devices is generated in particular, step 490 includes displaying the list of the plurality of remote communication devices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A communication device comprising:
an RF transceiver for communicating first data with a first remote communication device via a first protocol and a first frequency band in a first mode of operation;
a millimeter wave transceiver for communicating second data with a second remote communication device via a second protocol and a 60 GHz frequency band in a second mode of operation;
a communication control module, coupled to the RF transceiver and the millimeter wave transceiver, for coordinating the communication of the first data and the second data with the first remote communication device and the second remote communication device; and
a graphical interface device, coupled to the communication control module, for selecting at least one of the first remote communication device and the second remote communication device and for selecting at least one of the first mode of operation and the second mode of operation, based on actions of a user.

2. The communication device of claim 1 wherein the first protocol includes at least one of: a wireless local area network protocol; a wireless piconet protocol; and a wireless telephony protocol.

3. The communication device of claim 1 wherein communication control module generates a list of the plurality of remote communication devices and wherein the graphical interface module displays a plurality of remote communication devices that includes the first remote communication device and the second remote communication device.

4. The communication device of claim 3 wherein the graphical interface module displays the list of the plurality of remote communication devices as a plurality of icons corresponding to the plurality of remote communication devices.

5. The communication device of claim 4 wherein the graphical interface module includes a touch screen.

6. The communication device of claim 3 wherein the list of the plurality of remote communication devices indicates a first subset of the plurality of remote communication devices available by direct communication and a second subset of the plurality of remote communication devices available by indirect communication.

7. The communication device of claim 3 wherein the list of the plurality of remote communication devices indicates a first subset of the plurality of remote communication devices available via communications in the first frequency band and a second subset of the plurality of remote communication devices available via the 60 GHz band.

8. The communication device of claim 3 wherein the communications control module stores registration information corresponding to a plurality of registered remote communication devices, and compare the list of the plurality of remote communication device to the plurality of registered remote communication devices and wherein list of the plurality of remote communication devices indicates a first subset of the plurality of remote communication devices that are included in the registered remote communication devices.

9. The communication device of claim 3 wherein the communications control module stores registration information corresponding to a plurality of registered remote communication devices, and compare the list of the plurality of remote communication device to the plurality of registered remote communication devices and wherein list of the plurality of remote communication devices indicates a first subset of the plurality of remote communication devices that are not included in the registered remote communication devices.

10. A method comprising:
communicating first data with a first remote communication device via a first protocol and a first frequency band in a first mode of operation;
communicating second data with a second remote communication device via a second protocol and a 60 GHz frequency band in a second mode of operation;
coordinating the communication of the first data and the second data with the first remote communication device and the second remote communication device;
graphically selecting the first remote communication device and the second remote communication device based on actions of a user; and
graphically selecting at least one of the first mode of operation and the second mode of operation, based on the actions of the user.

11. The method of claim 10 wherein the first protocol includes at least one of: a wireless local area network protocol; a wireless piconet protocol; and a wireless telephony protocol.

12. The method of claim 10 further comprising:
generating a list a plurality of remote communication devices that includes the first remote communication device and the second remote communication device and wherein graphically selecting the first remote communication device and the second remote communication device includes displaying the list of the plurality of remote communication devices.

13. The method of claim 12 wherein the displaying the list includes displaying the list of the plurality of remote communication devices as a plurality of icons corresponding to the plurality of remote communication devices.

14. The method of claim 13 wherein graphically selecting the first remote communication device and the second remote communication device includes receiving user input via a touch screen.

15. The method of claim 12 wherein the list of the plurality of remote communication devices indicates a first subset of the plurality of remote communication devices available by direct communication and a second subset of the plurality of remote communication devices available by indirect communication.

16. The method of claim 12 wherein the list of the plurality of remote communication devices indicates a first subset of the plurality of remote communication devices available via communications in the first frequency band and a second subset of the plurality of remote communication devices available via the 60 GHz frequency band.

17. The method of claim 12 further comprising;
storing registration information corresponding to a plurality of registered remote communication devices; and
comparing the list of the plurality of remote communication device to the plurality of registered remote communication devices;
wherein list of the plurality of remote communication devices indicates a first subset of the plurality of remote communication devices that are included in the registered remote communication devices.

18. The method of claim 12 further comprising;
storing registration information corresponding to a plurality of registered remote communication devices; and
comparing the list of the plurality of remote communication device to the plurality of registered remote communication devices;
wherein list of the plurality of remote communication devices indicates a first subset of the plurality of remote communication devices that are not included in the registered remote communication devices.

* * * * *

UNITED STATES PATENT AND TRADEMARK OFFICE
CERTIFICATE OF CORRECTION

PATENT NO. : 8,090,879 B2  
APPLICATION NO. : 12/889894  
DATED : January 3, 2012  
INVENTOR(S) : Ahmadreza Rofougaran Page 1 of 1

It is certified that error appears in the above-identified patent and that said Letters Patent is hereby corrected as shown below:

Col. 23, in Claim 8, line 54, replace "device" with --devices--  
    Col. 23, in Claim 8, line 55, after "and wherein" insert --the--  
    Col. 23, in Claim 9, line 62, after "and" replace "compare" with --compares--  
    Col. 23, in Claim 9, line 63, replace "device" with --devices--  
    Col. 23, in Claim 9, line 64, after "and wherein" insert --the--  
    Col. 24, in Claim 12, line 21, replace "a list a" with --a list of a--  
    Col. 24, in Claim 17, line 51, replace "device" with --devices--  
    Col. 24, in Claim 17, line 53, after "wherein" insert --the--  
    Col. 24, in Claim 18, line 60, replace "device" with --devices--  
    Col. 24, in Claim 18, line 62, after "wherein" insert --the--

Signed and Sealed this  
Ninth Day of April, 2013

Teresa Stanek Rea  
*Acting Director of the United States Patent and Trademark Office*